United States Patent [19]

Miller

[11] Patent Number: 5,056,852
[45] Date of Patent: Oct. 15, 1991

[54] VEHICLE SUNVISOR INCLUDING MECHANISM FOR SECURING COVERING ON SUNVISOR AND SUPPORTING SUNVISOR WITHIN VEHICLE AND METHOD OF MAKING SAME

[75] Inventor: Douglas C. Miller, Hersey, Mich.

[73] Assignee: Plasta Fiber Industries, Inc., Marlette, Mich.

[21] Appl. No.: 649,908

[22] Filed: Feb. 4, 1991

[51] Int. Cl.$^5$ .............................................. B60J 3/00
[52] U.S. Cl. .................................... 296/97.1; 29/453
[58] Field of Search ................... 296/97.1, 97.9, 97.5; 29/453

[56] References Cited

U.S. PATENT DOCUMENTS

| | | | |
|---|---|---|---|
| 3,827,748 | 8/1974 | Herr et al. | 296/97.1 |
| 4,679,843 | 7/1987 | Spykerman | 296/97.1 |
| 4,711,483 | 12/1987 | Gulette et al. | 296/97.1 |
| 4,763,946 | 8/1988 | Robbins et al. | 296/97.1 |
| 4,867,500 | 9/1989 | Oosterbaan et al. | 296/97.1 |

Primary Examiner—Robert R. Song
Attorney, Agent, or Firm—Brooks & Kushman

[57] ABSTRACT

A sunvisor for an automotive vehicle has a shell or frame with two separate halves foldable along a common edge. The shell halves have juxtaposed notches along the common edge and clamping flanges or ribs on one surface thereof adjacent the notches. A visor body is formed by folding the shell halves along the common edge. After folding, the visor body has an inner cavity. A retainer or support pin is integrally formed with a fabric tucking flange. Before closing the shell halves, the support pin is placed and held so as to force the cover fabric into its final position. Upon closure of the shell halves, the clamping flanges cooperate to retain the support pin and cover fabric. The support pin cooperates with a sunvisor support latch to support the sunvisor with the vehicle.

9 Claims, 1 Drawing Sheet

VEHICLE SUNVISOR INCLUDING MECHANISM FOR SECURING COVERING ON SUNVISOR AND SUPPORTING SUNVISOR WITHIN VEHICLE AND METHOD OF MAKING SAME

CROSS-REFERENCE TO RELATED APPLICATIONS

This application is related to co-pending applications entitled "Sunvisor with Covering Attachment Mechanism", U.S. Ser. No. 570,864 filed Aug. 22, 1990 and "Sunvisor Including a Method and Attachment Mechanism for Securing a Covering to the Sunvisor", U.S. Ser. No. 609,159, , filed Nov. 2, 1990, both of which have the same Assignee as the present application and both of which are hereby expressly incorporated by reference.

TECHNICAL FIELD

This invention relates to sunvisors and to a method for making them.

BACKGROUND OF THE INVENTION

Sunvisors for vehicles have been manufactured of a plastic, shell-type core or frame covered with a material which is colored to match the interior upholstery of the vehicle. Early visor designs used a construction process wherein the edge of the material covered visor was trimmed using a trim bead. Particular designs stitched the trim bead directly into the plastic material shell or frame. This stitching is both expensive and difficult. In addition, these trim bead or stitched designs are unattractive to some users. Newer generation designs attempt to eliminate the trim bead and provide a neat and clean appearance of the visor edges while still effectively retaining the material covering on the visor shell.

Visor designs of this new generation necessarily require that the material utilized as a covering for the visor be pre-tucked or adhered inside the body of the visor before the two visor halves are attached or bonded together because the material covering tends to pull out or loosen during or after shell closure. The material covering adhesion process requires that a bonding cement or glue be used to attach the material covering to the inside of a shell half prior to construction of the visor as a separate operation.

One prior art visor discloses a visor core with a plurality of outwardly projecting pins and corresponding mating recesses and a framework pattern of ridges that act in conjunction as a fabric clamping structure when the respective halves of the visor core are brought together. The assembly process of this embodiment requires separate operations for placing and holding the fabric on the visor core, and insertion of a mounting post or support pin into a mating socket within the visor core. An additional operation is required to insert a sharpened metal pin through the end of the visor to hold the support pin in place.

U.S. Pat. No. 3,193,323 issued July 6, 1965, discloses a U-shaped yoke, the legs of which are pushed through the padding material so as to leave a recess and are hooked in a holder on the wire frame.

U.S. Pat. No. 4,570,990, issued Feb. 18, 1986, discloses in one embodiment the use of a snap ring combination or frame which compressively holds upholstery material against the walls of the core. In another embodiment, the upholstery material is wrapped around the free edges of the shell core and held in place around the peripheral boundary of the visor by adhesive and by the clamping action of the visor core itself.

The present invention incorporates the neat and clear appearance of the nonadhesion mechanisms for material retention while improving the efficiency and cost of production of shell type sunvisors.

SUMMARY OF THE INVENTION

The visor of the present invention overcomes the deficiencies of the prior art by providing a mounting post or support pin having a tucking flange operatively connected to a visor frame or support means. The pin is a unitary mechanism that can be inserted in a single operation, thus overcoming the need in the prior art designs for an operation adhering the material to the inside of the visor body prior to closure of the visor halves and other separate operations of inserting the pin into the visor body and inserting a metal pin through the end of the visor.

Accordingly, a general object of the present invention is to provide a relatively inexpensive method and mechanism for retaining sunvisor covering on a shell-type visor body while supplying a support pin on the visor for latching support of the sunvisor within the vehicle.

More particularly, a sunvisor is formed with a foldable half shell-type visor body covered with a fabric material or the like. A support pin has a tucking flange which is utilized to push and tuck the material covering down inside the folded visor body sufficiently to engage clamping flanges contained on the inner walls of the visor body after the visor body halves are folded together. This pin has a support means opposite the tucking flange shaped or configured to correspond with a respective inboard support latch located on the inside of the vehicle above the windshield.

A more specific object of the present invention is to provide an arrangement for covering a visor body with a material covering in an aesthetically pleasing fashion to prevent the material covering from pulling out or loosening when the visor halves are closed or folded to form the visor body. The visor halves are provided with flanges which are adapted by the closing of the visor halves to form clamping flanges. The support pin with tucking flange is used to push the material covering into a juxtaposed set of notches contained along a common edge or fold of the visor halves before the visor halves are brought together to form the shell-type visor body. The pin is present in the notches at the time the visor halves are initially closed or brought together and remains in the aperture formed by the juxtaposed notches until the visor body is formed. After closing of the visor halves, the pin is trapped by the clamping flanges and effectively secures the material fabric within the visor body during the entire manufacturing process to produce a material covered visor with little or no loosening or "bagging" of the material.

Another more specific object of the invention is to provide an improved material covered sunvisor. The improved sunvisor has a support pin that cooperates with a sunvisor support latch on a vehicle. The sunvisor is comprised of a shell with two halves foldable together along a common edge. Each half has a juxtaposed notch along the common edge and clamping flanges. Material is used to cover the shell and a support pin with a tucking flange is inserted into the aperture formed by the juxtaposed notches sufficiently to engage the clamping flanges and retain the material on the sunvisor shell.

The support pin of the present invention has an inboard support means that cooperates with the inboard support latch to effectively retain the sunvisor in a particular position inside the vehicle. The pin additionally contains a tucking flange having a protruding member sufficient to engage clamping flanges contained within the sunvisor shell. These members are configured to tuck the covering material within the sunvisor while smoothing the material on the surface of the sunvisor.

Another object of this invention is an improved method of making a material-covered sunvisor with a foldable frame and a support pin which tucks the material into the visor as the frame is folded and is trapped on the visor along with the material after the frame is folded.

The features and advantages of the invention are readily apparent from the following detailed description of the present invention when taken in conjunction with the accompanying drawings.

BEST MODE FOR CARRYING OUT INVENTION

Figure 1:
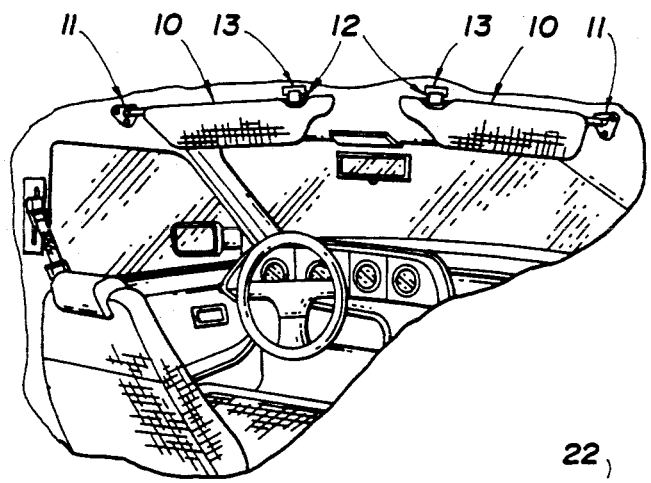
FIG. 1 is a fragmentary view from inside a vehicle of the improved sunvisor of this invention.
Figure 2:
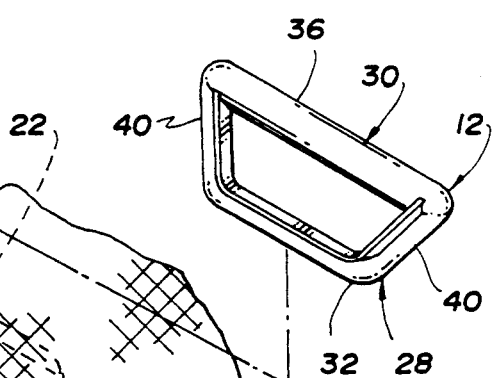
FIG. 2 is an exploded, fragmentary, perspective view, of a sunvisor during the manufacture thereof showing a shell with a covering of material thereon over an aperture in the shell with a retainer pin poised for cooperation with the shell and the material as the visor is formed.
Figure 2:
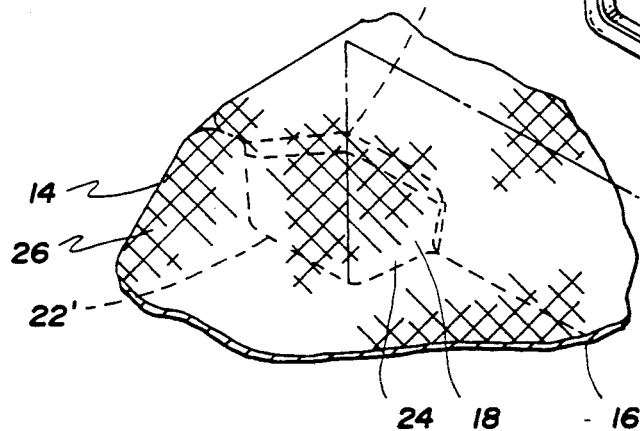

FIG. 1 shows the inside of a vehicle having a pair of improved sunvisors 10 of the invention. As is conventional, each sunvisor 10 pivots in two directions about a fixed pivot 11 and is adapted to be releasably, pivotally fastened or latched to an inboard support latch 13 above the windshield of the vehicle.

Referring to FIGS. 1 through 4, FIG. 1 illustrates the sunvisor 10, and a retainer or support pin generally indicated at 12. The sunvisor shell 14 has two halves that are foldable along a common edge 16.

A cavity 18 is formed when the two halves of the sunvisor shell 14 are brought together by folding along the common edge 16. Each sunvisor shell 14 has juxtaposed notches 22 and 22' contained along the common edge 16. These juxtaposed notches 22 and 22' form an aperture 24 sufficiently large to allow a tucking flange 28 of the retainer pin 12 to be inserted into the shell cavity 18. These juxtaposed notches 22 and 22' are formed by clamping flanges 20 and 20' which are shaped so as to provide sufficient surface engagement with tucking flange 28 of the pin 12 when inserted into the cavity 18.

A material covering 26 which may be colored and textured to match the interior upholstery of the vehicle is placed over the sunvisor shell 14 prior to folding the shell 14. This material 26 is placed over the sunvisor shell 14 so that the material 26 covers the entire shell 14 and also the aperture 24 formed by the juxtaposed notches 22 and 22'. The pin 12 with the tucking flange 28 on its retaining member 40 is operatively positioned inside the aperture 24 of the shell 14 to engage the material covering 26 prior to and during closure of the shell 14 that eventually forms the visor body.

The pin 12 has an inboard support means 30 that cooperates with the inboard support latch 13 on the vehicle. This inboard support latch 13 and inboard support means 30 should be designed so that insertion and release of the support means 30 can be effectuated with minimal effort and still safely contain the sunvisor 10 in a pivotable storage position against the headliner of the vehicle. The specific embodiment disclosed in FIG. 2 has an inboard support means which is an elongate cylindrical member 36.

Figure 3:
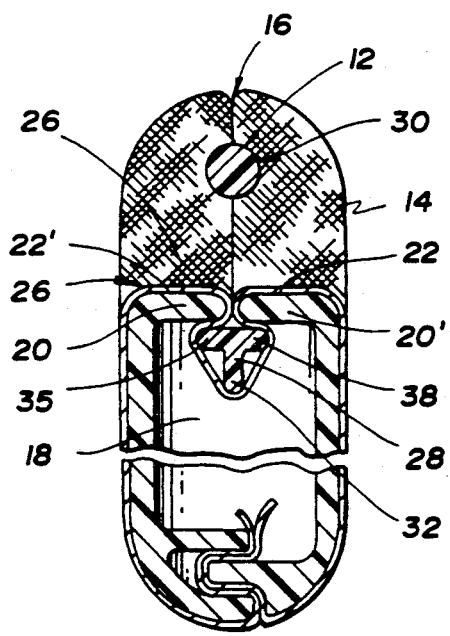
FIG. 3 is a fragmentary cross-sectional view of the visor and the retainer pin after the visor is formed with the retainer pin in cooperation with said sunvisor shell and illustrating a tucking flange on the retainer pin after insertion through the aperture into the sunvisor shell cavity for securing and smoothing the material covering the sunvisor.

FIG. 3 illustrates the tucking flange 28 with a central member 32 formed as a tee by two retaining members 35 and 38 which engage the material covering 26 as the flange 28 pushes the material 26 inside the shell cavity 18. Then as the shell 14 closes to complete the visor 10, the retaining members 35, 38 are trapped behind the clamping flanges 20, 20' along with the material 26. This frees the cylindrical member 36 for latching cooperation with the vehicle latch 13.

Referring still to FIG. 3, the flange 28 is configured to smooth the material 26 around the notches 22, 22' as the shell 14 is folded, whereby to lock the retaining members 35 and 38 and the material 26 onto the sunvisor 10 at the notches 22 and 22'. The material is also secured in the bottom portion of the shell 14 when folded, as better illustrated in the above-noted application U.S. Ser. No. 570,864, filed Aug. 22, 1990.

Figure 4:
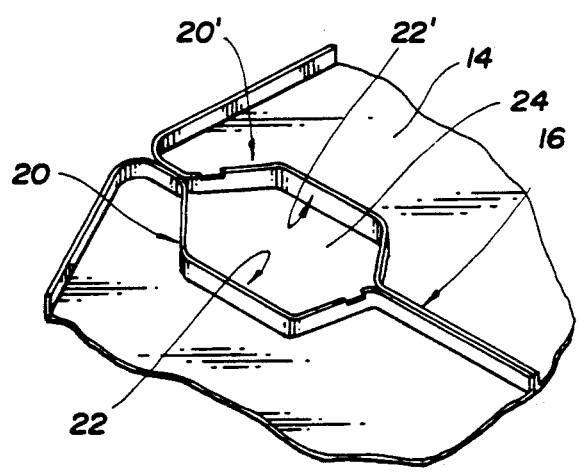
FIG. 4 is a fragmentary, perspective interior view of an unfolded sunvisor shell showing the notches and clamping flanges which cooperate in this invention.

Referring to FIG. 4, the edges of the clamping flanges 20,20' are configured to include cut-outs respectively at opposite ends of the aperture 24 to provide clearance for the ends of the cylindrical member 36 of the pin 12 when the shell 14 is closed.

Although the best mode for carrying out this invention has been described in detail, those familiar with the art to which this invention relates will recognize various alternative designs and embodiments for practicing the invention as defined by the following claims.

What is claimed is:

1. An improved material covered sunvisor having a retainer pin adapted to cooperate with a sunvisor support latch on a vehicle, said sunvisor comprising:

a shell having two halves foldable together along a common edge to form a cavity including a clamping flange, each half having a juxtaposed notch along said common edge which forms an aperture when said halves are placed together prior to folding together;

a material covering one side of both halves including said juxtaposed notches; and a support pin including a tucking flange insertable into said cavity through said aperture formed by said juxtaposed notches after said material covers said notches and while the two sides of said shell are folded together to form the cavity, said tucking flange being insertable into said cavity sufficiently to engage said material and said tucking flange on said clamping flange, whereby to retain said support pin and said material in said cavity after the two halves of said shell are folded together.

2. An improved material covered sunvisor as in claim 1, wherein said shell is integrally molded of a polymeric material.

3. An improved material covered sunvisor as in claim 1, wherein said material is a fabric, leather, or synthetic material.

4. A retainer pin for use with an inboard support latch and a material-covered sunvisor having a clamping flange within and comprising:
   support means adapted to cooperate with said inboard support latch for latching the sunvisor to said vehicle; and
   a tucking flange on said support means having retaining members extending sufficiently from said support means to engage said clamping flange when used with the sunvisor and configured to tuck said material into retaining engagement with said clamping flange while smoothing the material on the sunvisor.

5. A retainer pin as in claim 4, wherein said inboard support means and tucking flange are of integrally formed, one piece construction.

6. A retainer pin as in claim 4, wherein said inboard support means and tucking flange are integrally molded of a polymeric material.

7. A retainer pin as in claim 4, wherein said inboard support means is an elongate, cylindrical member adapted to cooperate with a sunvisor support latch on a vehicle.

8. A retainer pin as in claim 4, wherein said tucking flange is comprised of a plurality of retaining members formed in cross-section as a tee whereby the material is smoothed in the sunvisor.

9. A method of making a material-covered sunvisor having a cover material retainer comprising the steps of:
   providing a foldable shell with a clamping flange and a notch;
   covering said shell and said notch with said material;
   folding the shell and the material to form a cavity enclosing said flange and a material-covered opening to said cavity including said notch;
   tucking same material with said retainer through said notch into said cavity in locking engagement with said clamping flange as the shell is folded, whereby to lock said retainer and said material onto the sunvisor at said notch; and
   forming said sunvisor while tucking said material.

* * * * *